(12) United States Patent
Zogakis (10) Patent No.: US 7,499,505 B2
(45) Date of Patent: Mar. 3, 2009

(54) TRELLIS DECODING WITH FINITE CONSTELLATION BOUNDARIES

(75) Inventor: Thomas Nicholas Zogakis, Plan, TX (US)

(73) Assignee: Texas Instruments Incorporated, Dallas, TX (US)

( * ) Notice: Subject to any disclaimer, the term of this patent is extended or adjusted under 35 U.S.C. 154(b) by 652 days.

(21) Appl. No.: 10/740,251

(22) Filed: Dec. 18, 2003

(65) Prior Publication Data

US 2004/0264618 A1    Dec. 30, 2004

Related U.S. Application Data

(60) Provisional application No. 60/482,729, filed on Jun. 26, 2003.

(51) Int. Cl.
*H04L 27/00*    (2006.01)

(52) U.S. Cl. ...................................... 375/317

(58) Field of Classification Search ............... 375/316, 375/317, 324
See application file for complete search history.

(56) References Cited

U.S. PATENT DOCUMENTS

| | | | | |
|---|---|---|---|---|
| 4,247,944 A | * | 1/1981 | Sifford | 375/340 |
| 5,684,842 A | * | 11/1997 | Daffara | 375/354 |
| 6,721,356 B1 | * | 4/2004 | Cole et al. | 375/222 |
| 6,819,719 B2 | * | 11/2004 | Schelstraete | 375/262 |
| 6,847,694 B1 | * | 1/2005 | Chevrette et al. | 375/365 |

OTHER PUBLICATIONS

"International Telecommunication Union—ITU-T G.992.1—Series G: Transmission Systems and Media, Digital Systems and Networks, Digital Transmission Systems—Digital Sections and Digital Line System—Access Networks—Asymmetric Digital Subscriber Line (ADSL) Transceivers," International Telecommunication Union, Jun. 1999, Geneva, Switzerland.

* cited by examiner

*Primary Examiner*—Kevin M Burd
(74) *Attorney, Agent, or Firm*—Steven A. Shaw; W. James Brady; Frederick J. Telecky, Jr.

(57) ABSTRACT

System and method for improving trellis decoding in communications systems with finite constellation boundaries. A preferred embodiment for a received point of a tone when the tone represents a number of bits greater than three comprises determining if a received point lies outside of a specified region, wherein the specified region is dependent upon the number of bits, and transforming the received point if the received point lies outside of the specified region. The transformation moves the received point onto a boundary of the specified region, which can help in the correct decoding of the received point.

10 Claims, 5 Drawing Sheets

TRELLIS DECODING WITH FINITE CONSTELLATION BOUNDARIES

This application claims the benefit of U.S. Provisional Application No. 60/482,729, filed Jun. 26, 2003, entitled "Pre-Processor to Improve Trellis Decoding with Finite Constellation Boundaries", which application is hereby incorporated herein by reference.

CROSS-REFERENCE TO RELATED APPLICATIONS

This application is related to the following co-pending and commonly assigned patent application Ser. No. 10/748,998, filed Dec. 30, 2003, entitled "Algorithm for Computing Distances to a Received Point in an ADSL System," which application is hereby incorporated herein by reference.

TECHNICAL FIELD

The present invention relates generally to a system and method for digital communications, and more particularly to a system and method for improving trellis decoding in communications systems with finite constellation boundaries.

BACKGROUND

In an initial step of a decoder using a Viterbi algorithm (commonly used to decode a trellis code used in asymmetric digital subscriber line (ADSL) communications systems), the decoder needs to compute the Euclidean distance of a received point to four points on a two-dimensional (2-D) grid, wherein each of the four points belong to one of four different cosets and is the closest point in its respective coset to the received point. For a given number of bits represented by an ADSL tone, there is a corresponding constellation diagram. Since the number of bits is finite, the constellation diagram also contains a finite number of points.

A commonly used technique to simplify the distance computations (and other computations) is to assume that the received point lies on an infinite grid. For example, the use of an infinite grid can preclude the need to compute squared terms. The use of an infinite grid also places a limit on the possible size of a squared distance. The limit on the size of a squared distance may have an impact upon possible sizes of path metrics.

A disadvantage of the prior art is that the constellation diagrams have a finite number of points. Therefore, the assumption of using an infinite grid is incorrect. The use of an infinite grid can result in a measurable performance decrease relative to optimal decoding, especially when the number of bits in the constellation is small.

SUMMARY OF THE INVENTION

These and other problems are generally solved or circumvented, and technical advantages are generally achieved, by preferred embodiments of the present invention which provides for a system and method for improving trellis decoding in communications systems with finite constellation boundaries.

In accordance with a preferred embodiment of the present invention, a method for adjusting a received point for a tone, wherein the tone represents a number of bits greater than three, the method comprising determining if the received point lies outside of a specified region, wherein the specified region is dependent upon the number of bits, and applying a transformation to the received point if the received point lies outside of the specified region is provided.

In accordance with another preferred embodiment of the present invention, a method for adjusting a received point for a tone, wherein the tone represents a number of bits equal to three, the method comprising determining a quadrant location for the received point, rotating the received point into a first quadrant if the received point is outside of the first quadrant, determining a zone in which the received point lies, applying a transformation for the received point based upon the zone, and rotating the received point back to its quadrant location if the received point was outside of the first quadrant is provided.

In accordance with another preferred embodiment of the present invention, a receiver comprising a filter coupled to a signal input, the filter to eliminate out-of-band signals in a signal provided by the signal input, a transform unit coupled to the filter, the transform unit containing circuitry to convert the signal from a time domain signal into a frequency domain signal, a fixer unit coupled to the transform unit, the fixer unit containing circuitry to adjust received points contained in the frequency domain signal that lie outside of a specified region, and a decoder coupled to the fixer unit, the decoder containing circuitry to extract data from the received point provided by the fixer unit is provided.

An advantage of a preferred embodiment of the present invention is the use of a finite grid in place of an infinite grid can result in a measurable improvement in receiver performance, especially when the number of bits is small.

A further advantage of a preferred embodiment of the present invention is that the present invention can be used without changing existing designs for decoders and interfaces. Therefore, the present invention can be quickly implemented without costly changes to hardware or software.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions lo not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a communications system that is adherent to the asymmetric digital subscriber line (ADSL) technical specifications. The ADSL technical specifications can be found in a document entitled "International Telecommunication Union—ITU-T G.992.1—Series G: Transmission Systems and Media, Digital Systems and Networks, Digital Transmission Systems—Digital Sections and Digital Line System—Access Networks—Asymmetric Digital Subscriber Line (ADSL) Transceivers," published June 1999, which is herein incorporated by reference. The invention may also be applied, however, to other digital subscriber line systems, such as G.lite, ADSL2, and ADSL+. Furthermore, the invention can have application in other systems where there may be a need to find points closest to a specified point, wherein the points are part of a regular structure.

Figure 1:
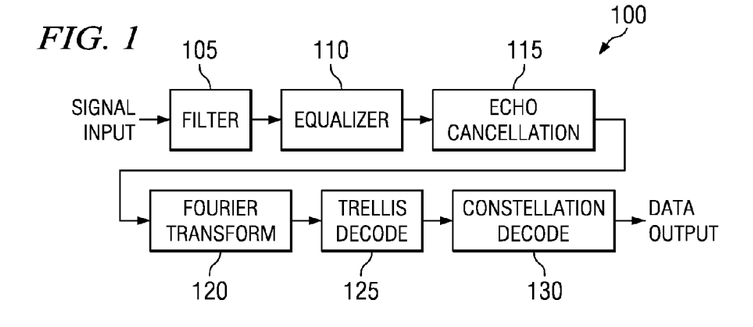
FIG. 1 is a diagram of a portion of a receiver.

With reference now to FIG. 1, there is shown a diagram illustrating a portion of a receiver 100 for use in an ADSL communications system. FIG. 1 displays a portion of the receiver responsible for receiving a signal that has been transmitted and then processing the received signal to convert the received signal back into data form that can be used by devices coupled to the receiver 100. The received signal can be provided to the receiver 100 by a signal input, which may be an antenna or signal receiver (in the case of a wireless system) or a signal port (in the case of a wired system). A filter 105 may then filter the received signal. The filtering can be used to help eliminate out-of-band interferers, for example. It can also be used to band-limit the received signal. An equalizer 110 can then be used to flatten the received signal or to shorten the communications channel impulse response.

An echo cancellation unit 115 can be used to eliminate images of the transmitted signal that may be present in the received signal. Since in an ADSL system the transmitted signal (and hence, the received signal) is transmitted in its time domain representation but is manipulated in its frequency domain representation, a Fourier transform unit 120 can be used to convert the received signal into a frequency domain signal. Typically, a fast Fourier transform (FFT) can be used to perform a rapid conversion, however, other implementations of the Fourier transform may be used. After conversion into a frequency domain signal, a trellis decoder 125 and a constellation decoder 130 can be used to convert tones carried in the received signal into data that can be used by devices coupled to the receiver 100.

According to the ADSL technical specifications, a plurality of tones can be used to carry data in the transmitted signal of an ADSL communications system. Each tone can carry a number of data bits varying from two (2) bits to fifteen (15) bits, with the number of bits per tone being dependent upon the quality of the communications channel in the frequency range to be occupied by the tone. For example, if the frequency range to be occupied by a tone is of questionable quality, then the tone may be allowed to only carry a small number of bits. The use of a small number of bits in a tone can help increase the probability of the bits being successfully recovered at the receiver.

A 2-D constellation diagram can be drawn for each tone based upon the number of bits carried in the tone. For example, a tone with two bits of data can be represented with a 2-D constellation diagram with four points, while a tone with seven bits of data can be represented with a 2-D constellation diagram with 128 points. According to the ADSL technical specifications, a 2-D constellation diagram can be divided into four quadrants, with an equivalent number of constellation points in each quadrant. Furthermore, each constellation point is a member one of four cosets. Constellation diagrams and cosets are considered well understood by those of ordinary skill in the art of the present invention. For a detailed explanation of the cosets, please refer to the ADSL technical specifications.

In an ADSL communications system, a trellis code can be used to encode the two least significant bits of each tone while any remaining bits are left unencoded. At a receiver, a Viterbi algorithm can be used to optimally decode the two encoded bits, which can then be provided to a slicer to permit the processing of the higher order bits in the tone. An initial step in the Viterbi algorithm involves the computation of Euclidean distances between a received point (corresponding to the tone) and the closest point in each of four cosets. As discussed previously, typically, the computation of the Euclidean distances involves an assumption that the received point is on an infinitely large 2-D grid. However, since the number of bits per tone is finite, the actual grid is not infinite.

Figure 2:
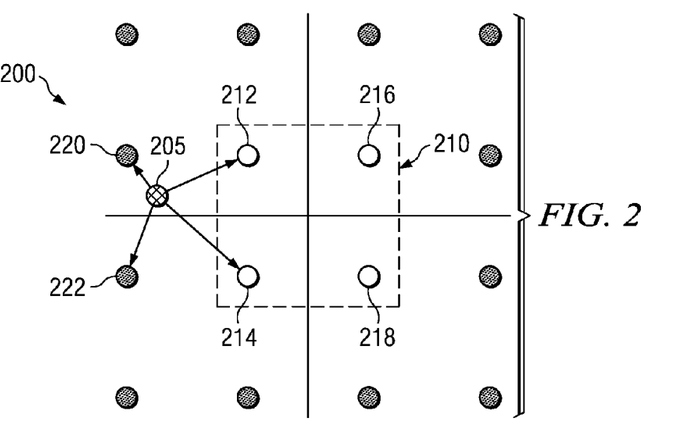
FIG. 2 is a diagram of a two-dimensional grid displaying the Euclidean distance between a received point and several points on the grid.

With reference now to FIG. 2, there is shown a diagram illustrating a 2-D grid 200 wherein the Euclidean distance between a received point 205 and several points on the grid 200 is computed. As shown in FIG. 2, the received point 205 corresponds to a tone that represents two bits. With two bits, the received point 205 may be one of four possible constellation points. A highlighted region 210 highlights a boundary around four possible constellation points 212, 214, 216, and 218, which could represent a 2-D grid for the tone if a finite 2-D constellation boundary were to be used. The received point 205 falls outside of the highlighted region 210, which may have been the result of interference (noise and/or interferers) encountered during transmission.

Since the received point 205 lies outside of the highlighted region 210, when it comes to determining a point in each of the four possible cosets that is closest to the received point 205, it may be possible that some of these points be outside of the highlighted region 210. As it turns out, the four points that are closest to the received point 205 and each belonging to a different coset are points 212, 214, 220 and 222. Note that points 220 and 222 are outside of the highlighted region 210. Therefore, the received point 205 cannot possibly be either of the two points 220 or 222.

Figure 3:
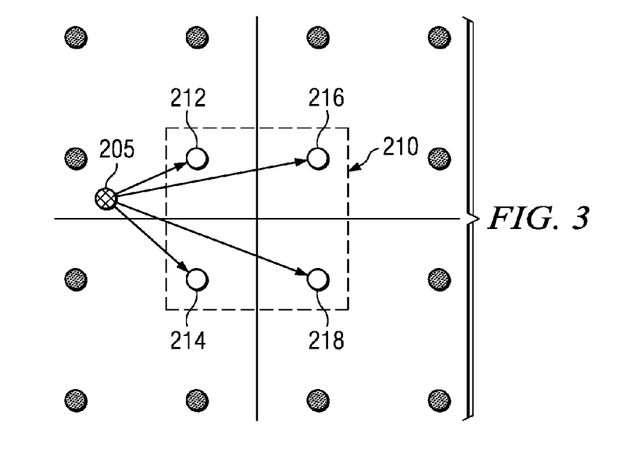
FIG. 3 is a diagram of a correct distance computation for a received point.

With reference now to FIG. 3, there is shown a diagram illustrating a proper set of points for the received point 205. As shown in FIG. 3, a proper set of four points for the received point 205 are points 212, 214, 216, and 218, regardless of the location of the received point in relation to the highlighted region 210. Since there are only four points in the highlighted region 210, the proper set of four points wherein each of the points belongs to a different coset and each point is the closest point in its coset to the received point 205.

However, using simple methods of determining a Euclidean distance between two points and then minimizing the Euclidean distance to find a requisite set of four points will not find the set of four points to be points 212, 214, 216, and 218 (as displayed in FIG. 3), rather the set of four points will be points 212, 214, 220, and 222 (as displayed in FIG. 2), when the received point 205 is located in a position as displayed in FIGS. 2 and 3.

Figure 4:
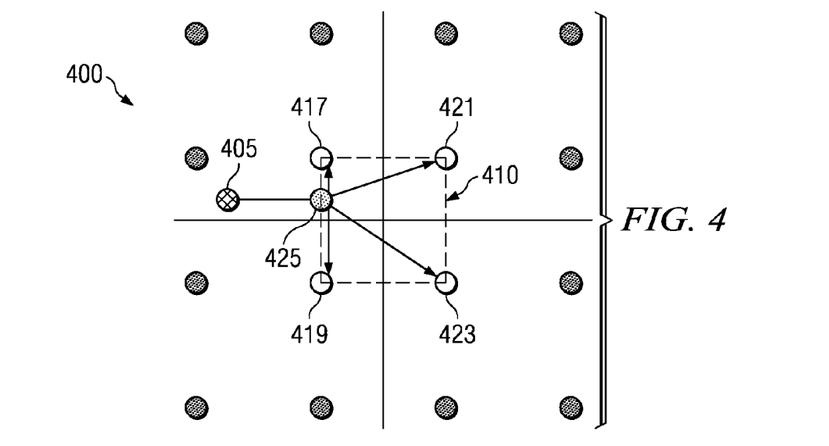
FIG. 4 is a diagram of adjustments to a received point to help increase the probability of correctly decoding the received point, according to a preferred embodiment of the present invention.

With reference now to FIG. 4, there is shown a diagram illustrating a 2-D grid 400 and a received point 405 wherein an adjustment can be made to the received point to help increase the probability that the set of four points is such that each of the four points belong to a different coset and are the closest point of their coset to the received point, according to a preferred embodiment of the present invention. The 2-D grid 400 displays an infinite number of points with a highlighted region 410 containing four highlighted points (points 417, 419, 421, and 423). The highlighted points 417, 419, 421, and 423 represent the actual points for a constellation when an associated tone carries two bits of data.

As discussed previously, since the received point 405 is outside of the constellation (the highlighted region 410), chances are that at least some of the points from each of the four cosets will not be a valid point in the constellation. To help increase the probability that the points will all be valid points in the constellation, the received point 405 can be adjusted so that it resides on the boundary of the highlighted region 410. The adjustment results in the received point 405 moving to point 425. The adjustment can occur along one or both of the two axes (X and/or Y). Note that while the adjustment may not guarantee that all of the selected points for the four cosets will be valid points, it can still greatly improve the performance of the receiver, especially for smaller values of bits.

Figure 5:
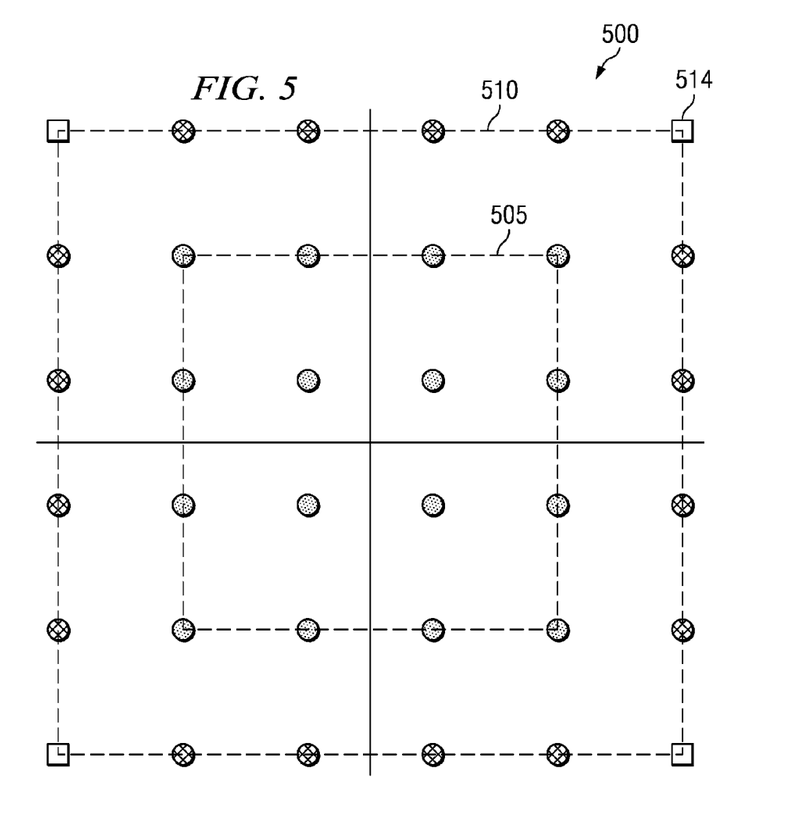
FIG. 5 is a diagram of boundaries of a constellation diagram for tones representing four and five bits, according to a preferred embodiment of the present invention.

With reference now to FIG. 5, there is shown a diagram illustrating a 2-D grid 500 wherein boundaries are shown for a tone representing four bits (boundary 505) and five bits (boundary 510), according to a preferred embodiment of the present invention. When the number of bits represent in a tone is an odd number, the resulting constellation may not be square in shape. Rather, for odd values greater than three (3), the shape of the resulting constellation has the appearance of a cross. Note that when the constellation for a tone when the tone represents an odd number of bits, the boundary that encompasses the constellation may contain portions that do not contain points that are part of the constellation, such as region 514. For example, in a five bit constellation, the region 514 may represent only a single constellation point. However, for higher values, the regions may represent a larger number of constellation points. These regions are commonly referred to as corner regions.

The boundaries drawn around the constellations (such as the boundary 505 and 510) can be used in the determining if a received point is inside or outside of the constellation. If the received point is outside of the constellation, either the X or the Y or both components of the received point can be changed so that the received point is adjusted to be on the boundary. While this works well when the number of bits may be greater than three, when the number of bits is equal to three, special logic may be required. This may be due to the special shape of a constellation for a tone representing three bits.

Figure 6:
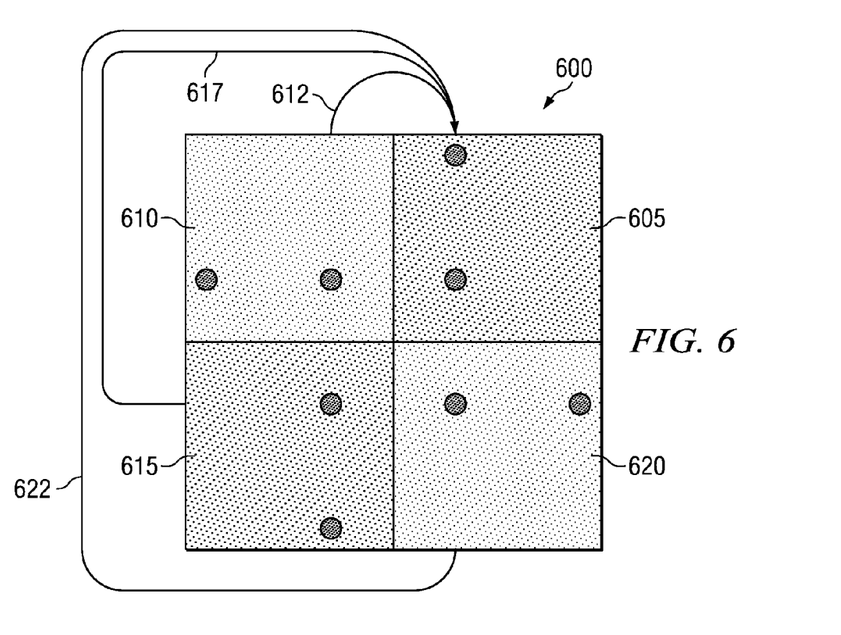
FIG. 6 is a diagram of a boundary of a constellation diagram for a tone representing three bits, according to a preferred embodiment of the present invention.

With reference now to FIG. 6, there is shown a diagram illustrating a constellation 600 for a tone representing three bits, according to a preferred embodiment of the present invention. The constellation 600 for a tone representing three bits has a total of eight points ($2^3$) and can be arranged in a pattern as shown in FIG. 6. Operating on a received point in the constellation 600 can be simplified by working on a single quadrant, such as a first quadrant 605. Since the constellation 600 can be generated by duplicating the first quadrant 605 and then rotating it, it may be possible to operate entirely within the first quadrant 605. For example, a second quadrant 610 can be transformed into the first quadrant by performing a 90 degree rotation 612. Similar transformations can be performed on a third quadrant 615 (via a 180 degree rotation 617) and a fourth quadrant 620 (via a 270 degree rotation 622).

Figure 7:
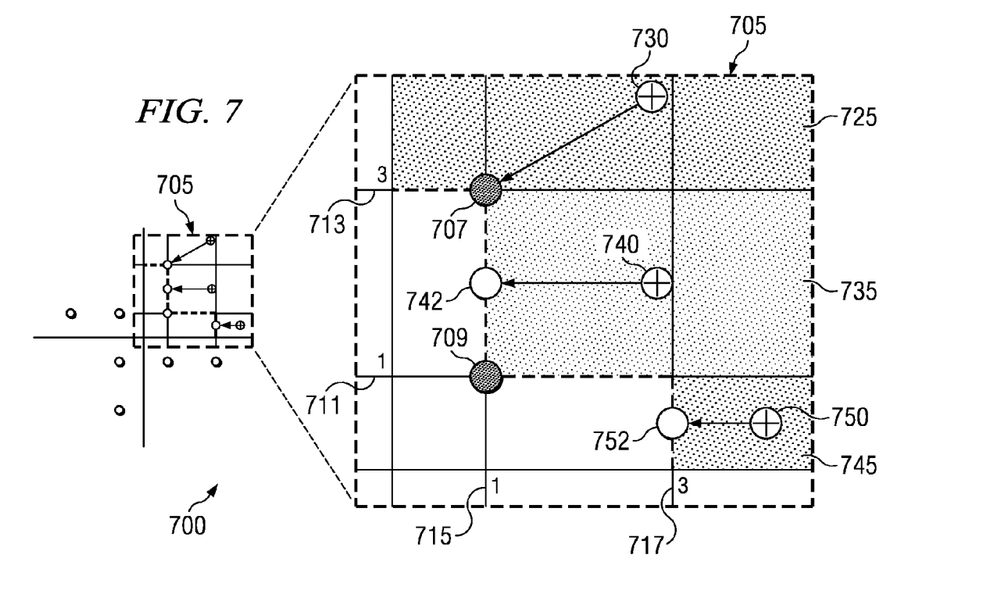
FIG. 7 is a diagram of a constellation diagram for a tone representing three bits and operations for adjusting a received point from outside of the constellation onto a boundary of a specified region, according to a preferred embodiment of the present invention.

With reference now to FIG. 7, there is shown a diagram illustrating a constellation 700 for a tone representing three bits and operations for adjusting a received point from outside of the constellation 700 onto a boundary, wherein the operations take place in a first quadrant 705, according to a preferred embodiment of the present invention. Taking a closer look at the first quadrant 705, there is shown a pair of points 707 and 709. Based upon these points 707 and 709, a series of lines may be drawn to help establish the boundaries of the constellation 700. A first line 711, which may be referred to as boundary Y 711, can represent a minimum value of Y in the constellation 700. A second line 713, which may be referred to as MAXY 713, can represent a maximum value of Y in the constellation 700. Similarly, a third line 715 and a fourth line 717 can represent a minimum (boundary X) and a maximum value (MAXX) of X in the constellation 700. As displayed in FIG. 7, values for boundary Y and boundary X may occur at one (1) while MAXY and MAXX may occur at three (3). However, these values may be different depending upon how a constellation is drawn.

According to a preferred embodiment of the present invention, a received point can appear in one of three zones within the first quadrant 705. A first zone 725 can be defined for values of Y greater than MAXY and for any value of X. A second zone 735 can be defined for values of Y greater than boundary Y but less than MAXY and for values of X greater than boundary X. A third zone 745 can be defined for values of Y less than boundary Y and for values of X greater than MAXX.

A received point appearing in the first zone 725, such as received point 730, can be adjusted to point 707, which may be achieved by setting the X coordinate of the received point 730 to boundary X and the Y coordinate to MAXY. A received point, such as received point 740, appearing in the second zone 735 can be adjusted to point 742, which can be achieved by setting the X coordinate of the received point 740 to be equal to boundary X. Finally, a received point, such as received point 750, appearing in the third zone 745 can be adjusted to point 752, which can be achieved by setting the X coordinate of the received point 750 to MAXX. For received points appearing in quadrants (an initial quadrant) other than the first quadrant 705, a rotation can be performed to move the initial quadrant where the received point appears into the first quadrant 705 and then the above transformations can be performed. This can then be followed by an inverse rotation to bring the first quadrant 705 back to the initial quadrant.

Figure 8:
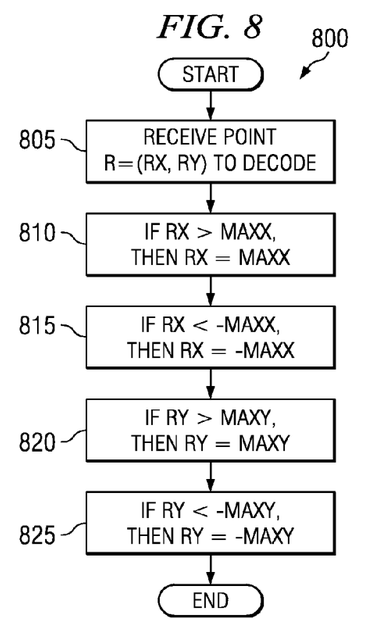
FIG. 8 is a diagram of an algorithm for adjusting a received point, wherein the tone represents a number of bits greater than three, according to a preferred embodiment of the present invention.

With reference now to FIG. 8, there is shown a diagram illustrating an algorithm 800 for adjusting a received point that may be outside of a constellation, wherein the constellation can represent a number of bits greater than three, according to a preferred embodiment of the present invention. According to a preferred embodiment of the present invention, the algorithm 800 may execute in a processor, a control unit, or a custom designed circuit (none shown) for a receiver (not shown) and may take place prior to a trellis decode operation. The processor can begin execution of the algorithm 800 after receiving a received point, R (block 805). The processor may initially check to see if an X-coordinate of the received point is greater than MAXX (block 810). If the X-coordinate of R is greater than MAXX, then the X-coordinate can be set to be equal to MAXX. The processor can also check to see if the X-coordinate is less than negative MAXX (block 815). If the X-coordinate is less than negative MAXX, then the X-coordinate can be set to be equal to –MAXX. The processor can also check to see if a Y-coordinate of R is greater than MAXY (block 820) or less than negative MAXY (block 825). The adjusted received point can then be provided to decoding circuitry (or software) for further processing.

Figure 9:
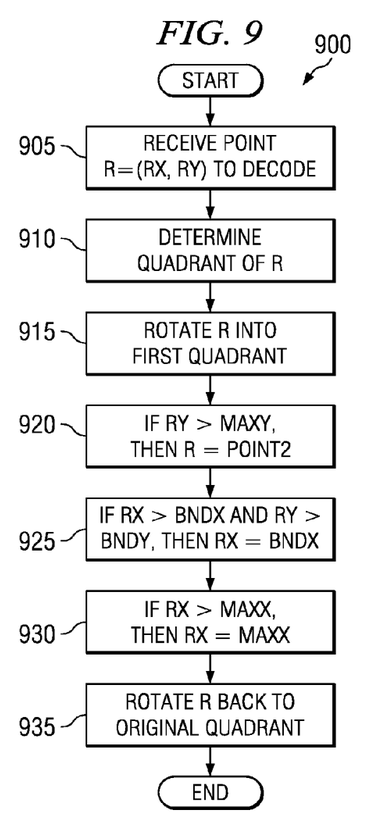
FIG. 9 is a diagram of an algorithm for adjusting a received point, wherein the tone represents a number of bits equal to three, according to a preferred embodiment of the present invention.

With reference now to FIG. 9, there is shown a diagram illustrating an algorithm 900 for adjusting a received point that may be outside of a constellation, wherein the constellation can represent a number of bits equal to three, according to a preferred embodiment of the present invention. As discussed above, the algorithm 900 may be executed in a processor, a control unit, or a custom designed circuit in a receiver. The processor may begin execution of the algorithm 900 after receiving a received point, R (block 905). The processor can then determine in which quadrant the received point, R, is located (block 910). If R is not located in the first quadrant, then the processor can rotate R so that it can be in the first quadrant (block 915).

The processor can then determine the location of R in the first quadrant. As discussed previously, R can be in one of three zones in the first quadrant (and still be outside of the constellation). Refer back to FIG. 7 for a detailed discussion of the three zones of the first quadrant. If a Y-coordinate of R is greater than MAXY (the first zone 725 (FIG. 7)), then R can be adjusted to the second of two constellation points in the first quadrant (block 920). This point is referred to as POINT2 in FIG. 9 and point 707 in FIG. 7. If the Y-coordinate of R is greater than boundary Y and a X-coordinate of R is greater than boundary X (the second zone 735 (FIG. 7)), then the X-coordinate of R is adjusted to be equal to boundary X (block 925). If the X-coordinate of R is greater than MAXX (the third zone 745 (FIG. 7)), then the X-coordinate of R is adjusted to be equal to MAXX (block 930). After making any needed adjustments to R, the processor can rotate R back from the first coordinate to its original quadrant (block 935). The adjusted received point can then be provided to decoding circuitry (or software) for further processing.

Relatively simple checks and transformations can be used to determine the location of the received point, R, and to rotate R to the first quadrant and then back to its original quadrant. For example, to determine the location of the received point, R, a simple sequence of checks can be used: If ((X>0) and (Y>0)) then R is in the first quadrant; If ((X>0) and (Y<0)) then R is in the second quadrant; If ((X<0) and (Y>0)) then R is in the third quadrant; and If ((X<0) and (Y<0)) then R is in the fourth quadrant. The transformations (rotations) can be equally simple: If R is in the first quadrant, then no transformation is needed; If R is in the second quadrant, then an equivalent R in the first quadrant can be (–Y, X), i.e., multiplied with (–1, 1); If R is in the third quadrant, then an equivalent R in the first quadrant can be (Y, –X); and If R is in the fourth quadrant, then an equivalent R in the first quadrant can be (–X, –Y). Finally, to return the adjusted R back to its original quadrant, the transformations can be: If R was in the first quadrant, then no transformation is needed; If R was in the second quadrant, then an equivalent R in the first quadrant can be (Y, –X); If R was in the third quadrant, then an equivalent R in the first quadrant can be (–Y, X); and If R was in the fourth quadrant, then an equivalent R in the first quadrant can be (–X, –Y).

The algorithms 800 and 900 illustrated in FIGS. 8 and 9 show the adjustments that can be made to received points for a series of tones with a constant number of bits per tone. However, the algorithms 800 and 900 can also be applied to received points for a series of tones wherein the number of bits can vary on a per tone basis.

Figure 10:
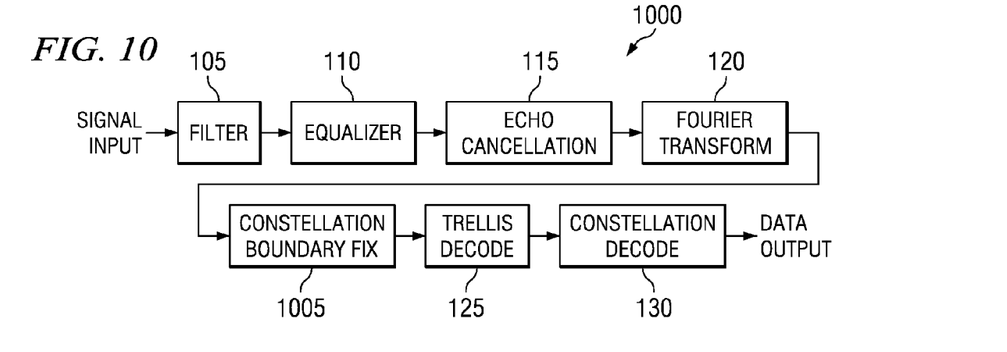
FIG. 10 is a diagram of a receiver with received point adjusting support, according to a preferred embodiment of the present invention.

With reference now to FIG. 10, there is shown a diagram illustrating a portion of a receiver 1000 for use in an ADSL communications system, according to a preferred embodiment of the present invention. The receiver 1000 can be similar in structure to the receiver 100 with the filter 105 that can be used to help eliminate out-of-band interferers. The equalizer 110 can be used to flatten the received signal. The echo cancellation unit 115 can remove images of the transmitted signal in the received signal and the fourier transform 120 can be used to convert the time domain received signal back into its frequency domain representation. A constellation boundary fixing unit 1005 can be used to correct received points in the received signal that lie outside of constellation boundaries. According to a preferred embodiment of the present invention, the constellation boundary fixing unit 1005 can implement received point adjusting algorithms such as those illustrated in FIGS. 8 and 9. The trellis decode 125 and constellation decode 130 units can be used to convert information carried in the received signal into data. Note that portions of the receiver 1000 can be implemented in hardware, software, firmware, or combinations thereof.

Figure 11:
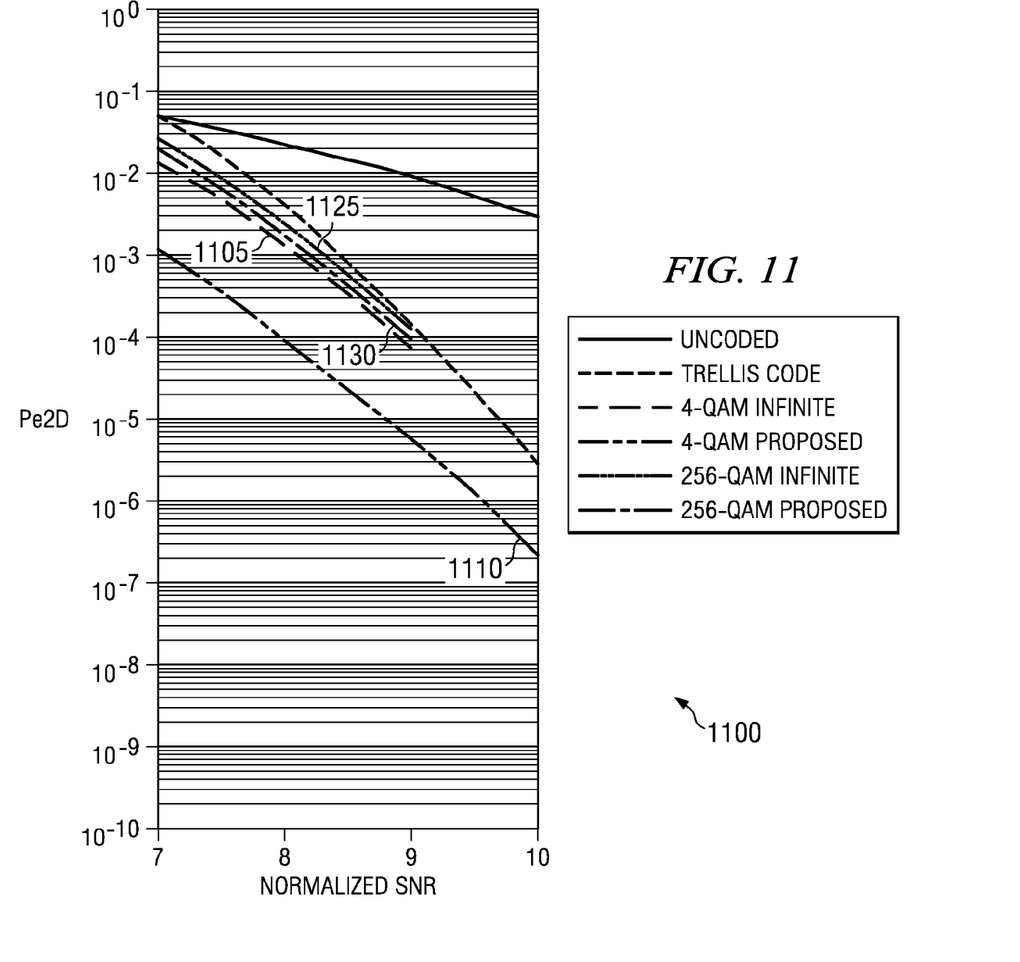
FIG. 11 is a data plot of system performance comparing no received point adjusting with received point adjusting, according to a preferred embodiment of the present invention.

With reference now to FIG. 11, there is shown a data plot 1100 illustrating a comparison of performance with and without the received point adjustment for a variety of bits, according to a preferred embodiment of the present invention. The data plot 1100 shows that for a small number of bits, the performance gain can be significant, while for a large number of bits, the performance gain can be smaller. A first curve 1105 displays the performance for a communications system using 4-QAM tones (2 bits) without received point adjustment and a second curve 1110 displays the performance for a communications system using 4-QAM tones with received point adjustment. A third curve 1125 displays the performance for a communications system using 256-QAM tones (8 bits) without received point adjustment and a fourth curve 1130 displays the performance for a communications system using 256-QAM tones with received point adjustment.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adjusting a received point for a tone received by a receiver, wherein the received point has an X and a Y coordinate, and wherein the tone represents a number of bits greater than three, the method comprising:
   determining if the received point lies outside of a specified region, wherein the specified region is dependent upon the number of bits, wherein the specified region is square in shape and is described by two values, wherein a first value, MAXX, describes a maximum extent of the specified region along an X-axis, and wherein a second value, MAXY, describes a maximum extent of the specified region along a Y-axis;
   applying a transformation to the received point if the received point lies outside of the specified region, wherein the transformation comprises shifting the received point into the specified region, the applying comprises:
      if the X coordinate is greater than MAXX, then the X coordinate is set to MAXX;
      if the X coordinate is less than −MAXX, then the X coordinate is set to −MAXX;
      if the Y coordinate is greater than MAXY, then the Y coordinate is set to MAXY; and
      if the Y coordinate is less than −MAXY, then the Y coordinate is set to −MAXY;
   providing the received point transformed to a decoder in the receiver if the received point is transformed; and
   providing the received point untransformed to the decoder if the received point lies inside of the specified region.

2. The method of claim 1 wherein MAXX is equal to MAXY.

3. A method for adjusting a received point for a tone received by a receiver, wherein the tone represents a number of bits greater than three, the method comprising:
   determining if the received point lies outside of a specified region, wherein the specified region is dependent upon the number of bits;
   applying a transformation to the received point if the received point lies outside of the specified region, wherein the transformation comprises shifting the received point into the specified region, wherein the specified region encompasses a two-dimensional grid containing $2^{(the\ number\ of\ bits)}$ constellation points, and wherein the specified region encompasses only the $2^{(the\ number\ of\ bits)}$ constellation points when the number of bits is even valued;
   providing the received point transformed to a decoder in the receiver if the received point is transformed; and
   providing the received point untransformed to the decoder if the received point lies inside of the specified region.

4. A method for adjusting a received point for a tone received by a receiver, wherein the tone represents a number of bits greater than three, the method comprising:
   determining if the received point lies outside of a specified region, wherein the specified region is dependent upon the number of bits;
   applying a transformation to the received point if the received point lies outside of the specified region, wherein the transformation comprises shifting the received point into the specified region, wherein the specified region encompasses a two-dimensional grid containing $2^{(the\ number\ of\ bits)}$ constellation points, and wherein the specified region encompasses the $2^{(the\ number\ of\ bits)}$ constellation points and empty regions when the number of bits is odd valued;
   providing the received point transformed to a decoder in the receiver if the received point is transformed; and
   providing the received point untransformed to the decoder if the received point lies inside of the specified region.

5. The method of claim 4, wherein the two-dimensional grid containing the $2^{(the\ number\ of\ bits)}$ constellation points has an appearance of a cross, and wherein the empty regions are a difference between the specified region containing the two-dimensional grid and the two-dimensional grid.

6. A receiver comprising:
   a filter coupled to a signal input, the filter to eliminate out-of-band signals in a signal provided by the signal input;
   a transform unit coupled to the filter, the transform unit containing circuitry to convert the signal from a time domain signal into a frequency domain signal;
   a fixer unit coupled to the transform unit, the fixer unit containing circuitry for adjusting a plurality of received points each received point having an X and a Y coordinate contained in the frequency domain signal that lie outside of a specified region into the specified region before passing the adjusted received points, and to pass unadjusted received points contained in the frequency domain signal that lie inside of the specified region, wherein the specified region is square in shape and is described by two values, wherein a first value, MAXX, describes a maximum extent of the specified region along an X-axis, and wherein a second value, MAXY, describes a maximum extent of the specified region along a Y-axis, wherein adjusting comprises shifting the received point into the specified region, comprising:
      if the X coordinate is greater than MAXX, then the X coordinate is set to MAXX;
      if the X coordinate is less than −MAXX, then the X coordinate is set to −MAXX;
      if the Y coordinate is greater than MAXY, then the Y coordinate is set to MAXY; and
      if the Y coordinate is less than −MAXY, then the Y coordinate is set to −MAXY;
   a decoder coupled to the fixer unit, the decoder containing circuitry to extract data from the received points provided by the fixer unit.

7. The receiver of claim 6 further comprising an equalizer coupled to the filter and the transform unit, the equalizer containing circuitry to gain adjust the signal.

8. The receiver of claim 6, wherein the decoder comprises a constellation decoder and a trellis decoder.

9. The receiver of claim 6, wherein the receiver is part of a device in a communications system.

10. The receiver of claim 9, wherein the communications system is an asymmetric digital subscriber line (ADSL) compliant communications system.

* * * * *